Oct. 20, 1953  L. H. FLORA  2,655,703
CLAMP

Filed Oct. 8, 1951  2 Sheets-Sheet 1

INVENTOR
LAURENCE H. FLORA
BY *H. G. Lombard*
ATTORNEY

Oct. 20, 1953      L. H. FLORA      2,655,703
CLAMP

Filed Oct. 8, 1951      2 Sheets-Sheet 2

INVENTOR
LAURENCE H. FLORA

BY H. G. Lombard

ATTORNEY

Patented Oct. 20, 1953

2,655,703

UNITED STATES PATENT OFFICE 2,655,703

CLAMP

Laurence H. Flora, Cleveland, Ohio, assignor to Tinnerman Products, Inc., Cleveland, Ohio, a corporation of Ohio Application October 8, 1951, Serial No. 250,327

7 Claims. (Cl. 24—16)

This invention relates in general to clamps or clips which are used in aircraft and other structures for mounting groups of electrical wires, conduits, or the like, to a supporting structure at spaced points along the path which they extend in mounted position on said supporting structure.

A widely used type of clamp or clip of this character comprises a resilient metal strap or band bent into the form of an open loop having end portions provided with connecting elements adapted to be connected together to secure the loop in closed relation around the wires or conduit. Heretofore, the connecting elements in this type of clamp have been provided by a simple curved hook, or the like, on one end of the clamp which is receivable in an opening in the other end portion of the clamp in engagement with a marginal portion of said opening to hold the clamp in closed relation around the group of electrical wires, conduit, or other object mounted on the support.

The clamps and clips, and the group of electrical wires or conduit supported thereby, are usually exposed in aircraft installations, particularly in military aircraft, such that there are many instances when the clamps or clips and the supported wires or conduit are subject to extraordinary loads, as, for example, when they are grasped by an occupant of an airplane as a means for steadying himself, or used as a handle by one lifting himself aboard, or otherwise employed for temporarily hanging various articles and gear in the airplane. Under any such extraordinary load, the clamps or clips necessarily are frequently forced open and thereby unintentionally and accidentally released to inoperative position inasmuch as they can withstand only a limited force when held in closed position by connecting means comprising a simple curved hook element, or the like, as aforesaid.

In other instances, such as, for example, when cargo or equipment is tightly loaded, there frequently are a number of clamps in which the loops or bands are under a direct compressive force which causes the clamps to spring open when not desired, thereby resulting in a faulty mounting of the wires or conduit intended to be supported by the clamps.

A primary object of the invention, therefore, is to provide a clamp or clip of this character which comprises a resilient metal strap or band having a connecting element on one end adapted to provide an interlocking connection in a special opening in the other end portion of the clamp, and which interlocking connection can be released only by a compressive force exerted angularly in lateral or oblique relation to the loop of the clamp. The arrangement, accordingly, is such that the connection maintaining the clamp or clip in closed position is not subject to undesired or unintended release as a result of an accidental compressive force on the loop of the clamp but rather, may be released only by what may be termed an angular force exerted obliquely to the band or loop of the clamp.

A further object of the invention is to provide a clamp or clip of the kind described in which the connecting means for the clamp comprises a generally T-shaped connecting element on one end defining a pair of lateral shoulders adapted to extend through an opening in the other end portion of said clamp and engage spaced marginal portions of said opening in such a way as to provide a positive interlocking connection of maximum strength and durability and which can be released only by compressive force exerted obliquely of the band or loop of the clamp, as aforesaid.

Another object of the invention is to provide a clip or clamp of this character which is readily manufactured in the usual standards and designs but with greatly increased strength as respects the connecting elements thereof and without need for increasing the size or gauge of the metal strap or materially enlarging the connecting elements thereof.

A further object of the invention is to provide a clamp or clip in which the aforesaid interlocking connection is adapted to be easily and quickly secured or released, as desired, before or after installation of the clamp upon a support such that the wires or conduit may be secured in the clamp before installation on the support, or applied or removed after the clamp is secured to the support.

Further objects and advantages, and other new and useful features in the construction and arrangement of the various elements of the invention will be readily apparent as the following description proceeds with reference to the accompanying drawings, for purposes of illustration but not of limitation, in which like reference characters designate like parts throughout, and in which.

Figure 5:
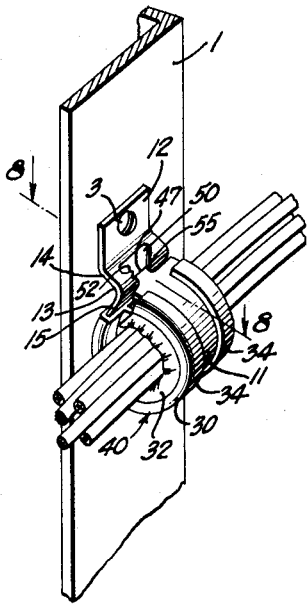
Fig. 5 is a perspective view of another form of clamp in accordance with the invention as attached to a support and in closed position mounting a group of electrical wires on said support.
Figure 7:
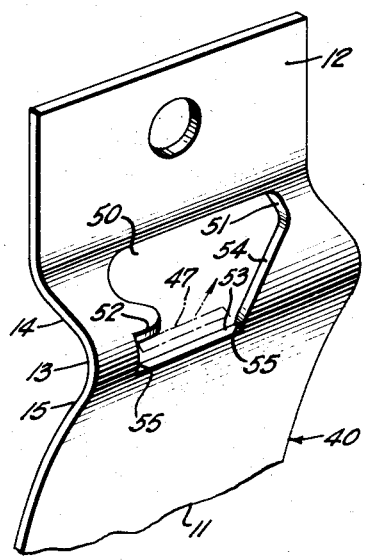
Figure 6:
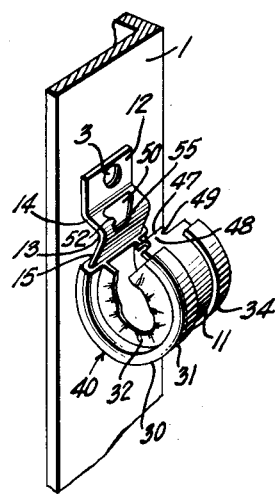
Fig. 6 is a similar perspective view showing the clamp attached to a support and in open position ready for receiving a group of electrical wires, a conduit, or other object to be mounted on the support.
Figure 8:
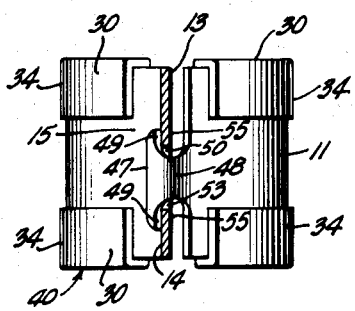

Fig. 7 is an enlarged, close-up perspective view showing the specific formation of the opening in the clamp of Figs. 5 and 6 for receiving a T-shaped connecting element on the free end of the clamp for interlocking engagement therewith, the connecting element being illustrated in broken lines; and Fig. 8 is a sectional view through the clamp in closed position, as along line 8—8 of Fig. 5, and shows the interlocking engagement of the T-shaped connecting element in the locking opening in the clamp in closed position.

Figure 1:
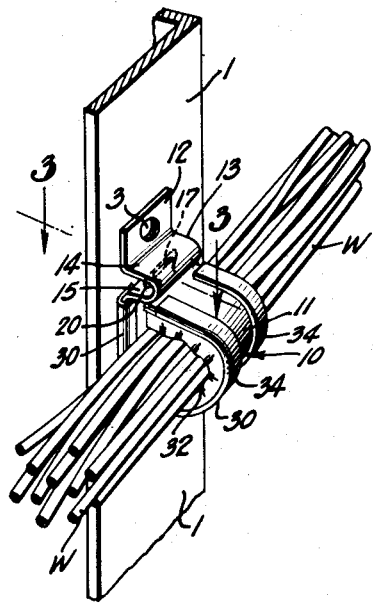
Fig. 1 is a perspective view showing a clamp or clip in accordance with the invention as attached to a support and in closed position mounting a group of electrical wires on said support.
Figure 2:
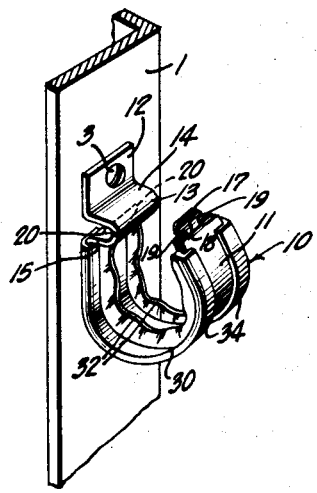
Fig. 2 is a similar perspective view showing the clamp attached to a support and in open position ready for receiving the group of electrical wires, conduit or other object to be mounted on the support.

Referring now, more particularly, to the drawings, Figs. 1–4, inclusive, show a clamp or clip in accordance with the invention, designated generally 10, comprising a strap or band 11 made of resilient spring metal and provided in a normally open loop, substantially as illustrated in Fig. 2. One end portion of the strap 11 is provided in a flange 12 adapted to be secured to a support 1 by any suitable fastening means such as a bolt or screw 3.

Adjacent the flange 12, the strap 11 is bent intermediately into U-shaped fold or bracket portion 13 projecting outwardly from said flange 12 and defining the upper arm 14 merging into a return bent lower arm 15 in spaced relation to said upper arm 14. The strap extends from the lower arm 15 in a loop of any desired size and terminates in an end portion of reduced width defining a locking element in the form of a generally T-shaped tab or tongue 17. The generally T-shaped tongue 17 is adapted to be received in an opening 20 in the lower arm 15, as best seen in Figs. 1 and 3, in interlocked relation in said opening 20.

Figure 3:
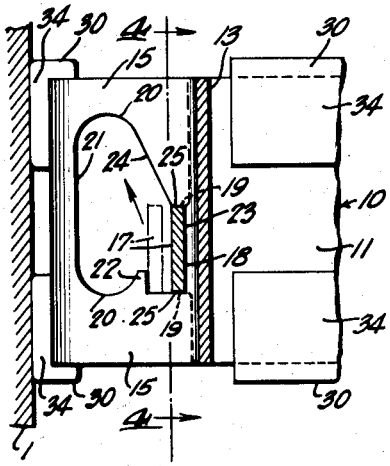
Fig. 3 is an enlarged, close-up view showing details of the connecting elements of the clamp as seen from within the U-shaped bracket portion thereof.

To this end, as shown in Fig. 3, said opening 20 in the lower arm 15 is provided in a special formation comprising an enlarged tranverse slot 21 communicating with a smaller slot 23 and having a locking lug or projection 22 extending into the area of said opening 20 between said slots 21 and 23. The smaller slot 23 is provided at the outer corner of the larger slot 21 with the opposite side 24 of said larger slot extending diagonally inwardly from the smaller slot 23. In the opening 20, thus provided, the marginal end portions of the smaller slot 23 define a pair of spaced abutments 25 adapted to be connected to the connecting element or tongue 17, while the inwardly projecting locking lug 22 serves to lock said tongue 17 in the opening 20 in connected relation with said abutments 25. The locking lug 22, accordingly, is adapted to lock the tongue 17 against removal from the opening 20 under a directly inward compressive force lengthwise of the loop of the clamp, as illustrated by the broken line showing of the tongue 17 in Fig. 3, such that said tongue 17 can be disconnected and released from the opening 20 only by a compressive force applied, more particularly, in an oblique direction along the diagonal side 24 of said larger slot 21 as indicated by the arrow in Fig. 3.

Figure 4:
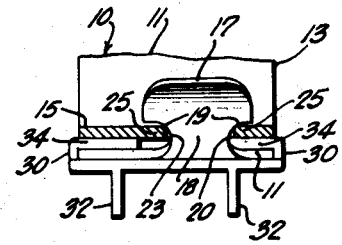
Fig. 4 is a sectional view of Fig. 3 along line 4—4, looking in the direction of the arrows.

The generally T-shaped tab or tongue 17 is of a suitable width to pass readily into the larger slot 21 and is provided on each edge with a cutout or recess defining a reduced neck portion 18, Fig. 4, intermediate a pair of spaced shoulders 19. The arrangement is such that the generally T-shaped tab or tongue 17 readily passes through the transverse slot 21 but only the reduced portion 18 thereof is receivable in the smaller slot 23 between the spaced abutments 25 such that said shoulders 19 are disposed in positive interlocked engagement with said spaced abutments 25 in said opening 20.

Preferably, the clamp is provided with a yieldable inner lining or cushion 30 which adapts the clamp for holding objects of various sizes and prevents chafing of the objects supported while otherwise absorbing vibration effects, and the like. This lining 30 is usually made of soft rubber, or the like, and comprises a band lying on the inner surface of the metal loop 11 and provided with longitudinally extending, inwardly projecting puckered ribs 32 which are adapted to engage yieldably an object of any size within the range of sizes for which the clamp is intended. Such a lining is retained on the metal band 11 in any suitable way and, in the present example, the lining 30 includes, for this purpose, inwardly extending marginal portions 34 which grip the longitudinal edges of the metal band 11 and thereby hold the lining 30 in place on the clamp.

The completed clamp 10 appears substantially as shown in Fig. 2 in its normal untensioned open position, such that the free end portion thereof carrying the tab or tongue 17 must be biased inwardly and thereby tensioned in connected relation in the opening 20 in the lower arm 15 of the fold 13, as aforesaid. The open clamp readily receives any suitable object such as a group of electrical wires W, Fig. 1, or a conduit or the like, whereupon the clamp is closed by pressure on the free end portion thereof to move the tab or tongue 17 under the lower arm portion 15 of the fold 13 until said tab or tongue 17 is aligned with and passes into the larger slot 21 of the opening 20 in said lower arm 15. The pressure on the clamp is then removed such that the free end of the clamp automatically snaps forward in attempting to assume its normal untensioned condition, and, said free end otherwise is simultaneously manipulated in a manner to move the tongue 17 angularly past the inwardly projecting locking lug 22 as necessary for the reduced portion 18 of said tongue 17 to pass into the smaller slot or recess 23 between the spaced abutments 25 to the limit defined by the end wall of said smaller slot, substantially as shown in Fig. 3. In this position, as seen in Fig. 4, the reduced portion 18 of the tongue or tab 17 is held between the abutments 25 while the laterally projecting shoulders 19 on said tongue 17 are seated in direct bearing engagement with said abutments 25 in interlocked relation therewith.

The tongue 17 as thus connected in the opening 20 is locked in such connected relation against accidental or unintended opening of the clamp by the inwardly projecting locking lug 22 as illustrated by the broken line showing of said tongue in Fig. 3. The arrangement is such that the locking lug 22 provides a positive lock of the tongue 17 against removal from the opening 20 under a directly inward compressive force lengthwise of the loop of the clamp such that said tongue 17 can be disconnected and released from the opening 20 only by a force applied, more particularly, generally inwardly and obliquely along the diagonal side 24 of said larger slot 21, as indicated by the arrow in Fig. 3.

The clamp is readily opened, when desired, by pressure on the free end portion thereof to move the tongue 17 inwardly until said tongue engages the inwardly projecting locking lug 22 in the position illustrated by the broken line showing of said tongue 17 in Fig. 3. In this position, the neck portion 18 of said tongue 17 opposite that engaged by the locking lug 22 has sufficient clearance from the diagonal side 24 of the slot 21 to permit movement of the tongue obliquely in the direction of the arrow in Fig. 3 into the area of the larger slot 21. The shoulders 19 on said tongue 17 thus are completely disengaged from the abutments 25 and accordingly, when downward pressure is exerted on the free end of the clamp, the tongue 17 is readily withdrawn through the slot 21 to disconnect the free end of the clamp from the opening 20 and permit the clamp to assume its open position shown in Fig. 2.

It will be appreciated that the clamp of the present invention is of relatively greater strength in the regions of the connecting elements thereof as a result of the provision of the locking element on the free end of the clamp in the form of an imperforate tab or tongue 17 which develops the full strength of the width of metal across the reduced portion 18 thereof, Fig. 4. Such a tab or tongue construction otherwise is provided without a hole or pronounced bend which might weaken the same or result in unwarranted distortion thereof.

A further advantage resides in the fact that the locking tongue or tab 17, as secured in the opening 20 on the lower arm 15 of the fold 13, is covered and concealed by the upper arm 14 of said fold in the closed position of the clamp, thereby eliminating any danger from the extremity of the tongue 17 and otherwise protecting said tongue against possible deformation or other damage.

Figs. 5-8, inclusive, disclose another form of clamp which is of the same general character as that described with reference to Figs. 1-4, inclusive, but in which the connection is provided by an opening in the upper arm of the outwardly projecting bracket or fold 13 on the clamp for receiving a slightly modified form of T-shaped tongue or tab on the free end of the clamp.

In this form of the invention the body of the clamp, designated generally 40, is substantially the same as that of Figs. 1-4, inclusive, and includes a generally similar outwardly projecting fold or bracket portion 13 defining an upper arm 14 merging into a return bent lower arm 15 in spaced relation to said upper arm 14. The strap 11 of the clamp extends in continuation of said lower arm in a loop of any desired size and terminates in an end portion of reduced width defining a locking element substantially in the form of a generally T-shaped tab or tongue 47.

The T-shaped tongue 47 is bent radially inwardly substantially normal to the band of the clamp in order to be received in the opening 50 in the upper arm 14, as seen in Fig. 5, in interlocked relation in said opening 50 in the general manner of the previously described form of the invention. To this end, said opening 50 is provided on the upper arm 14 in a generally similar form to comprise an enlarged transverse slot 51 communicating with a smaller slot 53 and having a lug or projection 52 extending into the area of said opening 50 between said slots 51 and 53. The smaller slot 53 is provided at the outer corner of the larger slot 51 with the opposite side 54 of said larger slot extending diagonally inwardly from the smaller slot 53. In the opening 50, thus provided, the marginal end portions of the smaller slot 53 define a pair of spaced abutments 55 adapted to be connected to the connecting element or tongue 47, while the inwardly projecting locking lug 52 serves to lock said tongue 47 in the opening 50 in connected relation with said abutments 55. The locking lug 52, accordingly, is adapted to lock the tongue 47 against removal from the opening 50 under a directly inward compressive force lengthwise of the loop of the clamp as illustrated by the broken line showing of the tongue 47 in Fig. 7, such that said tongue 47 can be disconnected and released from the opening 50 only by a force applied, more particularly, both inwardly and obliquely along the diagonal side 54 of said larger slot 51 as indicated by the arrow in Fig. 7.

The generally T-shaped tongue 47 is of a suitable width to pass readily into the larger slot 51 and is provided on each edge with a cutout or recess defining a reduced neck portion 48 intermediate a pair of spaced shoulders 49, Fig. 8. The arrangement is such that the generally T-shaped tab or tongue 47 readily passes through the larger transverse slot 51 but only the reduced portion 48 thereof is receivable in the smaller slot 53 between the spaced abutments 55 such that said shoulders 49 on the tab or tongue 47 are disposed in positive interlocked engagement with said spaced abutments 55 in said opening 50.

The completed clamp 40 appears substantially as shown in Fig. 6 in its normal untensioned open position, such that the free end portion thereof carrying the tab or tongue 47 must be biased inwardly and thereby tensioned in connected relation in the opening 50 in the upper arm 14 of the fold 13. The open clamp readily receives any suitable object such as a group of electrical wires W, Fig. 5, or a conduit or the like, whereupon the clamp is closed by pressure on the free end portion thereof to move the tongue 47 over the upper arm portion 14 of the fold 13 until said tongue 17 is aligned with and is adapted to be pressed downwardly into the larger slot 51 of the opening 50 in said upper arm 14. The free end of the clamp then automatically snaps forward in attempting to assume its normal untensioned condition and, in this relation, the free end of the clamp is simultaneously manipulated in a manner to move the tongue 47 angularly past the inwardly projecting locking lug 52 as necessary for the reduced portion 48 of said tongue 47 to move into the smaller slot or recess 53 between the spaced abutments 55 to the limit defined by the end wall of said smaller slot, substantially as shown in Figs. 5 and 8. In this position, as seen in Fig. 8, the reduced portion 48 of the tongue or tab 47 is held between the abutments 55 while the laterally projecting shoulders 49 on said tongue 47 are seated in direct bearing engagement with said abutments 55 in interlocked relation therewith. Likewise, the tongue 47 as thus connected in the opening 50 is locked in such connected relation against accidental or unintended opening of the clamp by the inwardly projecting locking lug 52, as illustrated by the broken line showing of said tongue in Fig. 7. The arrangement is such that the locking lug 52 provides a positive lock of the tongue 47 against removal from the opening 50 under a directly inward compressive force lengthwise of the loop of the clamp such that said tongue 47 can be disconnected and released from the opening 50 only by a force applied, more particularly, generally inwardly and obliquely along the diagonal side 54 of said larger slot 51, as indicated by the arrow in Fig. 7.

The clamp is readily opened, when desired, by pressure on the free end portion thereof to move the tongue 47 inwardly until said tongue engages the inwardly projecting locking lug 52 in the position illustrated by the broken line showing of said tongue 47 in Fig. 7. In this position, the neck portion 48 of said tongue 47 opposite that engaged by the locking lug 53 has sufficient clearance from the diagonal side 54 of the slot 51 to permit movement of the tongue obliquely in the direction of the arrow in Fig. 7 into the area of the larger slot 51. The shoulders 49 on said tongue 47 thus are completely disengaged from the abutments 55 and accordingly, when the free end of the clamp is lifted upwardly, the tongue 47 is readily withdrawn through the slot 51 to disconnect the free end of the clamp from the opening 50 and permit the clamp to assume its open position shown in Fig. 6.

The clamp or clip in either form of the invention preferably is constructed of relatively thin sheet metal the thickness of which is selected according to service requirements and the predetermined range of sizes of the objects with which the clamp is intended to be used. The clamp is most effective when provided of spring metal suitably spring tempered and otherwise treated to give the desired toughness and hardness, particularly in the case of devices which are subject to extreme vibration and heavy duty applications. A cheap and highly effective clamp or clip may be provided from cold rolled metal such as cold rolled steel which is untempered but of a spring metal nature and capable of providing an effective and reliable clamp or clip in accordance with the invention.

While the invention has been described in detail with specific examples, such examples are intended as illustrations only inasmuch as the invention fully contemplates various modifications which may be provided without departing from the scope of the instant disclosure.

What is claimed is:

1. A clamp comprising a sheet metal band in the form of a normally open loop, means for holding said loop in closed position comprising a portion of said band provided with an opening including a first slot merging into a second smaller slot defining an abutment bordering said smaller slot and a locking lug between said slots projecting into said opening at one side of said opening, the other side of said opening including a laterally enlarged area merging with said smaller slot, and another portion of said band including a tongue having a projecting shoulder, said tongue being adapted to extend through said first slot and be received in said smaller slot with said shoulder on said tongue bearing on said abutment in the closed position of the loop and with said locking lug engageable with said tongue to retain said tongue in said closed position of the loop, said tongue being removable from said opening upon movement thereof into said laterally enlarged area of said opening to clear said locking lug.

2. A clamp comprising a sheet metal band in the form of a normally open loop, means for holding said loop in closed position comprising a portion of said band provided with an opening including a first slot merging into a second smaller slot defining a pair of spaced abutments bordering said smaller slot and a locking lug between said slots projecting into said opening at one side of said opening, the other side of said opening including a laterally enlarged area merging with said smaller slot, and another portion of said band including a projecting tongue having a pair of shoulders on its side edges, said tongue being adapted to extend through said first slot and be received in said smaller slot with said pair of shoulders on said tongue bearing on said pair of spaced abutments in the closed position of the loop and with said locking lug engageable with said tongue to retain said tongue in said closed position of the loop, said tongue being removable from said opening upon movement thereof into said laterally enlarged area of said opening to clear said locking lug.

3. A clamp comprising a sheet metal band in the form of a normally open loop, means for holding said loop in closed position comprising a portion of said band provided with an opening including a first slot merging into a second smaller slot defining an abutment bordering said smaller slot and a locking lug between said slots projecting into said opening at one side of said opening, the other side of said opening extending diagonally outwardly from said smaller slot, and another portion of said band including a tongue having a projecting shoulder, said tongue being adapted to extend through said first slot and be received in said smaller slot with said shoulder on said tongue bearing on said abutment in the closed position of the loop and with said locking lug engageable with said tongue to retain said tongue in said closed position of the loop, said tongue being removable from said opening upon movement thereof into the area of said diagonally extending side of said opening to clear said locking lug.

4. A clamp comprising a sheet metal band in the form of a normally open loop, means for holding said loop in closed position comprising a portion of said band provided with an opening including a first slot merging into a second smaller slot defining an abutment bordering said smaller slot and a locking lug between said slots projecting into said opening at one side of said opening, the other side of said opening extending diagonally outwardly from said smaller slot, and another portion of said band including a projecting tongue having spaced shoulders on its side edges, said tongue being adapted to extend through said first slot and be received in said smaller slot with said shoulders on said tongue bearing on said pair of abutments in the closed position of the loop and with said locking lug engageable with said tongue to retain said tongue in said closed position of the loop, said tongue being removable from said opening upon movement thereof into the area of said diagonally extending side of said opening to clear said locking lug.

5. A clamp comprising a sheet metal band in the form of a normally open loop, means for holding said loop in closed position comprising a portion of said band bent into a forwardly extending fold defining spaced upper and lower arms, one of said arms being provided with an opening including a first slot merging into a second smaller slot defining an abutment bordering said smaller slot and a locking lug between said slots projecting into said opening at one side of said opening, the other side of said opening extending diagonally outwardly from said smaller slot, and another portion of said band including a tongue having a projecting shoulder, said tongue being adapted to extend through said first slot and be received in said smaller slot with said shoulder on said tongue bearing on said abutment in the closed position of the loop and with said locking lug engageable with said tongue to retain said tongue in said closed position of the loop, said tongue being removable from said opening upon movement thereof into the area of said diagonally extending side of said opening to clear said locking lug.

6. A clamp comprising a sheet metal band in the form of a normally open loop, means for holding said loop in closed position comprising one end portion of said band bent into a forwardly extending fold defining spaced upper and lower arms, said lower arm being provided with an opening including a first slot merging into a second smaller slot defining an abutment bordering said smaller slot and a locking lug between said slots projecting into said opening at one side of said opening, the other side of said opening extending diagonally outwardly from said smaller slot, and the other end portion of said band including a tongue having a projecting shoulder, said tongue being adapted to extend through said first slot and be received in said smaller slot with said shoulder on said tongue bearing on said abutment in the closed position of the loop and with said locking lug engageable with said tongue to retain said tongue in said closed position of the loop, said tongue being removable from said opening upon movement thereof into the area of said diagonally extending side of said opening to clear said locking lug.

7. A clamp comprising a sheet metal band in the form of a normally open loop, means for holding said loop in closed position comprising one end portion of said band bent into a forwardly extending fold defining spaced upper and lower arms, said upper arm being provided with an opening including a first slot merging into a second smaller slot defining an abutment bordering said smaller slot and a locking lug between said slots projecting into said opening at one side of said opening, the other side of said opening extending diagonally outwardly from said smaller slot, and the other end portion of said band including a tongue bent toward the interior of said loop and having a projecting shoulder, said tongue being adapted to extend through said first slot and be received in said smaller slot with said shoulder on said tongue bearing on said abutment in the closed position of the loop and with said locking lug engageable with said tongue to retain said tongue in said closed position of the loop, said tongue being removable from said opening upon movement thereof into the area of said diagonally extending side of said opening to clear said locking lug.

LAURENCE H. FLORA.

References Cited in the file of this patent

UNITED STATES PATENTS

| Number | Name | Date |
|---|---|---|
| 501,392 | Wiedenmann | July 11, 1893 |
| 553,194 | Lewis | Jan. 14, 1896 |
| 1,001,141 | Grosskopf | Aug. 22, 1911 |